United States Patent [19]
Glasser et al.

[11] 3,941,892
[45] Mar. 2, 1976

[54] LOW-CHOLESTEROL EGG PRODUCT AND PROCESS

[75] Inventors: George Marvin Glasser, Ossining; Herbert Matos, New York, both of N.Y.

[73] Assignee: General Foods Corporation, White Plains, N.Y.

[22] Filed: July 1, 1974

[21] Appl. No.: 484,382

[52] U.S. Cl. ............... 426/104; 426/250; 426/515; 426/585; 426/614
[51] Int. Cl.² .......................................... A23L 1/32
[58] Field of Search ........... 426/185, 189, 196, 211, 426/249, 348, 298, 299, 108, 112, 121, 614, 393

[56] References Cited
UNITED STATES PATENTS

| | | | |
|---|---|---|---|
| 3,475,180 | 10/1969 | Jones | 426/185 |
| 3,640,732 | 2/1972 | Johnson | 426/348 X |
| 3,843,825 | 10/1972 | Hawley | 426/393 |

*Primary Examiner*—Raymond N. Jones
*Assistant Examiner*—R. A. Yoncoskie
*Attorney, Agent, or Firm*—Thaddius J. Carvis; Daniel J. Donovan; Richard Kornutik

[57] ABSTRACT

A sunnyside up egg product which is low in cholesterol, preferably cholesterol-free, and relatively high in unsaturated fats is provided. It can be taken directly from the freezer and fried to give a product virtually identical to a natural egg fried sunnyside up. The egg product is made by molding a low cholesterol egg yolk portion of critical formulation together with an egg white portion consisting essentially of liquid egg white, and subjecting the molded egg to freezing. In the preferred embodiment of the invention, the mold employed in forming the egg product is employed as the package.

10 Claims, 2 Drawing Figures

LOW-CHOLESTEROL EGG PRODUCT AND PROCESS

BACKGROUND OF THE INVENTION

The present invention relates to a low cholesterol replacement for natural eggs, and, more particularly, to a low cholesterol, preferably cholesterol free, egg replacement which can be fried in conventional sunnyside up form.

There is increasing medical evidence that the continued consumption of high levels of food products high in cholesterol and saturated fats is at least one factor which may contribute to the relatively high rate of atherosclerosis experienced in this country. Thus, food researchers are exerting great efforts to obtain food products low in saturated fats and cholesterol.

Egg products in particular have received a great deal of attention because, although they are recognized as one of the most nutritious and popular foods, they are relatively high in both saturated fats and cholesterol. In the natural egg, it is the yolk which contains the cholesterol and saturated fats. Approximately 1.7% of the egg yolk weight is cholesterol and about ⅓ of the egg yolk weight is fat. Fatty acid analysis shows that the fat content of the average egg yolk is about 35.4% saturated fat (principally palmitic and stearic acids), 49.1% monounsaturated fat (oleic acid), and 15.5% polyunsaturated fat (linoleic acid). Thus, the ratio of polyunsaturated to saturated fat, hereinafter referred to as the P/S, is less than 0.5, an undesirable balance.

A number of workers have divised methods and formulations for preparing low cholesterol scrambled egg products; however, no one to my knowledge has heretofore divised a low cholesterol egg product which can be fried to provide a sunnyside up product having natural appearance and texture.

SUMMARY OF THE INVENTION

It is therefore an object of the present invention to produce a sunnyside up egg product both low in cholesterol, preferably free of cholesterol, and relatively high in unsaturated fats which can be fried to closely simulate a natural sunnyside up egg.

This and other objects are accomplished according to the present invention which provides a frozen, molded egg product comprising: (a) a yolk portion having a water to dry ingredient ratio of from about 0.8 to about 1.2, and comprising based on the weight of the dry ingredients, from about 20% to about 45% dried egg white, from about 5% to about 35% of an oil having a P/S of greater than about 0.6, from about 10% to about 55% of a dry milk protein source, from about 0.5% to about 7% vegetable gums, and emulsifiers, flavoring, and colors; and (b) an egg white portion consisting essentially of liquid egg white.

BRIEF DESCRIPTION OF THE DRAWINGS

A more complete understanding of the present invention is provided by the ensuing detailed description and the attached drawings wherein:

FIG. I is a top elevational view of the molded egg product according to the present invention; and FIG. II is a side view, partially in section, of the molded egg product of the present invention.

DETAILED DESCRIPTION

Figure 1:
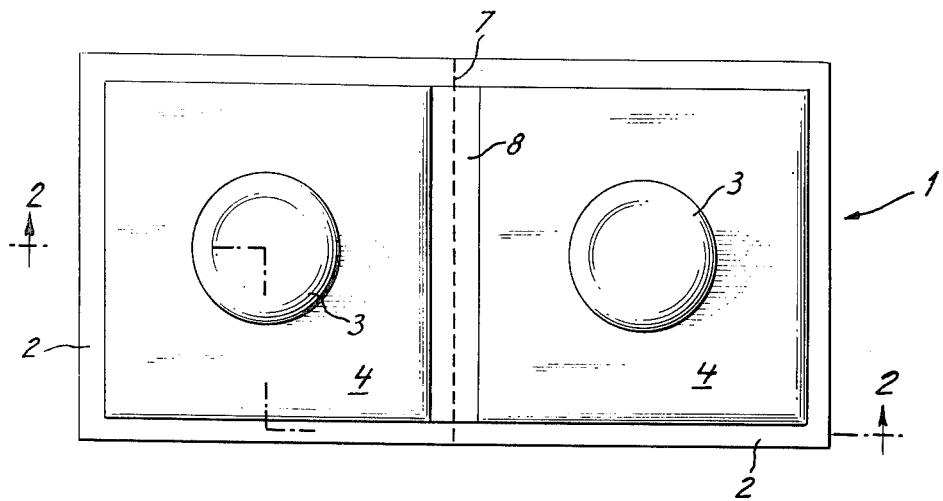
Figure 2:
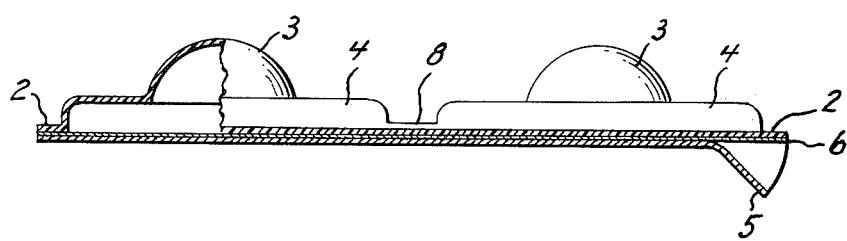

According to the present invention, it is now possible to obtain a fried sunnyside up egg product both low in cholesterol and relatively high in unsaturated fats. A method and composition for achieving this are provided.

FIGS. I and II show the molded egg product of the present invention, indicated generally as 1. In the particular exemplary situation a series of two eggs are shown. It is of course possible to provide a single egg or as many eggs as is desired for convenient packaging. Body portion 2 is seen to have a hemispherical yolk cavity 3 wherein the egg yolk portion is formed, and a flatter white cavity 4, wherein the egg white portion is formed. The body portion 2 is preferably inverted and utilized as the mold for preparing the egg product. Once the egg yolk portion and the egg white portion are cast by any suitable technique, the contents are subjected to freezing to solidify the mass.

The contents of the body portion 2 are sealed therein by means of an overlay 5, preferably of a polymer or polymer/metal foil material, and an adhesive material 6. Desirably, perforations 7 are provided between each of the individual egg portions for easy separation. In this exemplary situation there is seen a channel 8 extending between and connecting the two egg portions shown. This provides, in combination with perforations 7 a convenient means for separating the two egg portions.

The container body portions 2 are expeditiously made as needed for packaging in continuous vacuum forming machinery. If desired, the inside surfaces of these body portions can be coated with a vegetable oil or other release material; however, the preferred polyethylene and polyvinyl chloride polymer sheets generally do not require such release.

The yolk portion is synthesized from materials generally well known in the production of artificial egg products; however, they are employed in critical relationships to each other and to the total yolk composition to provide in the present invention, when frozen and employed along with a liquid egg white portion, the unique ability to be fried to provide a virtually natural-appearing sunnyside up egg product. Essential to the egg yolk portion is the presence of a number of materials, and a total water to dry ingredients ratio of within the range from about 0.8 to 1.2, preferably about 1. Of the dry ingredients, the composition should contain from about 20% to about 45% dried egg white, from about 5% to about 35% of an oil having a P/S of greater than about 0.6, from about 10% to about 55% of a dry milk protein source, from about 0.5% to about 7% of vegetable gum, and colors, flavorings and emulsifiers. Preferably, the yolk portion will comprise from about 25% to about 38% dried egg white, from about 10% to about 28% of the oil, from about 15% to about 50% of the dry milk protein source and from about 3.0% to about 6.0% of the vegetable gums. Additionally, the preferred oils are those having a P/S of greater than about 1. Other dry solids in the form of materials such as whey, Calgon sodium hexametaphosphate, sodium caseinate and starch can be employed in minor amounts to adjust the flavor or physical properties of the composition. While it is an object to provide a cholesterol-free egg product, small amounts of cholesterol are not inimical to the present invention. Thus, minor amounts of cholesterol containing materials, such as natural egg yolk, can be added for flavoring or other purposes.

The dried egg white can be obtained from any suitable commercial source which provides good taste and functionality. A preferred dried egg white source comprises high quality low temperature spray dried egg white.

Any oil or blend of vegetable or animal fats or oils can be employed according to the present invention so long as the P/S is maintained at above about 0.6, preferably above about 1.0. By proper selection, the P/S can be as high as about 8. Typical of the oils suitable are cottonseed oil, sunflower oil, corn oil, safflower oil, and soy bean oil.

It is necessary to the present invention to employ emulsifiers to maintain uniformity in the yolk portion of the egg product. It has been found that, by employing a combination of a hydrophobic emulsifier and a hydrophilic emulsifier, a near natural egg yolk functionality can be obtained. Such a combination, in fact, apparently functions by a mechanism similar to that of the lecithin and cholesterol present in natural egg yolks. Representative of the hydrophobic emulsifiers which can be employed according to the present invention are Atmos 300 mono and diglycerides of fat forming fatty acids, Emery 2421 glycerol monooleate, and Hodag PGML propyleneglycol monolaurate. Representative of the hydrophilic emulsifiers which can be employed according to the present invention are Tween 40 polyoxyethylene (20) sorbitan monopalmitate, Tween 60 polyoxyethylene (2) sorbitan monostearate, and Tween 80 polyoxyethylene (20) sorbitan monooleate. The use of a combination of emulsifiers according to the invention provides not only the desired characteristics of the egg product when fried, but also allows its use in most other recipes calling for eggs, e.g., french toast, cakes, cookies, scrambled eggs, egg nog, and the like. The combination of emulsifiers is generally employed at a level of from about 0.05% to about 5% by weight of the yolk portion.

The dry milk protein source can be supplied in a variety of forms. Representative of such are casein, lactalbumin, and spray dried milk solids. Preferably, low temperature spray dried non fat milk solids are employed.

The vegetable gum ingredient of the yolk portion is important for providing the proper viscosity and flow characteristics to the egg product during processing and final preparation. Moreover, the gum provides a natural glossy outer sheen to the fried egg product which closely approximates the glossy sheen of natural sunnyside up fried eggs. A combination of gums, such as guar gum and gum arabic, is preferred; however a single gum can be employed. Other gums, such as carboxy methyl cellulose and methyl cellulose may also be employed.

To prepare the yolk portion, the dry ingredients, except for the oil, can be simply dry blended before mixing with the oil. The preferred emulsifiers are those which are normally liquid and are blended with the dry ingredients absent the oil to provide easy and equal distribution over the dry mix. In this manner they are ready to perform their function rapidly upon blending with oil and water. Alternatively, normally solid emulsifiers can be employed but should be pre-melted. If desired, the hydrophobic emulsifier can be blended first with the oil. Certain of the dry ingredients such as the coloring, salt and Calgon sodium hexametaphosphate can be co-ground thoroughly prior to dry blending with the other dry ingredients. The oil is then simply mixed uniformly with the other dry ingredients to provide the total dry ingredients portion of the yolk portion.

The resulting mixture of dry ingredients is then admixed with the desired amount of water, preferably at a 1 to 1 ratio with the mixed dry ingredients, and blended thoroughly until no lumps are observable. By mixing the emulsifiers in the manner noted above, they are ready to act quickly to provide good blending, without foaming which is normally a problem when egg whites are employed. The liquid yolk portion is then poured into the yolk cavity 3 of the inverted mold. Thereafter, liquid egg white, either fresh, frozen or rehydrated dried egg white solids, is poured on top of the egg yolk portion into the white cavity of the mold. The white should have a thickness of between about ⅛ to about ¼ inch, preferably about 3/16 inch. The resulting layered product is then frozen. The egg product is preferably cooked by heating over low heat to a pan temperature of about 300° F ± 20° F.

The following examples are presented for the purpose of further illustrating and explaining the present invention and are not to be taken as limiting in any sense. Unless otherwise indicated, all parts and percentages are by weight.

EXAMPLE I

A dry yolk mix is prepared having the following composition:

| INGREDIENTS | PARTS |
|---|---|
| Tween 60 polyoxyethylene (20) sorbitan monostearate | 0.058 |
| Atmos 300 mono and diglycerides of fat forming fatty acids | 0.06 |
| spray dried egg white | 31.93 |
| Supro 610 high molecular weight soy isolate | 1.99 |
| sodium caseinate | 1.99 |
| cottonseed oil | 13.17 |
| raw tapioca starch | 1.99 |
| guar gum | 0.20 |
| gum arabic | 3.19 |
| Calgon sodium hexametaphosphate (unadjusted) | 1.19 |
| salt | 0.79 |
| Yellow No. 5 food coloring | 0.02 |
| Yellow No. 6 food coloring | 0.002 |
| non fat milk solids | 40.75 |
| sweet whey solids | 2.79 |

A polyvinyl chloride sheet is formed into a mold of the configuration shown in the figures. The yolk portion has a volume of about 70 ml and the white portion a volume of about 150 ml at a thickness of about 3/16 inch. To the yolk portion of the form is added a uniform blend of 30 g. of the above yolk mix and 30 ml of water — a water to dry ingredients ratio of 1. To the white portion of the mold is added 150 ml of fresh liquid egg white. The mold containing the egg is then placed in the freezer and the egg is frozen. After freezing, the egg is popped from the mold into an unheated, buttered fry pan. The pan is placed over a low flame (to a pan temperature of about 300°F) to fry the egg. Initially as the white thaws, it starts to run into an amorphous shape, and some white starts coagulating. Nothing happens to the yolk at this point except that it starts to thaw, retaining its molded shape. When nearly all the white has thawed, the white continues to coagulate into the typical shape of fried egg white. At this point the yolk is about ⅔ thawed and has started to flatten (losing at this time part of the shape of mold) nearly to the point of running from its shape. However, after this brief flattening, the yolk starts to coagulate and, in so doing, draws itself tight and partly shrinks, now taking on the full demeanor of a natural sunnyside up yolk in appearance, shape and texture. The yolk is soft and natural when eaten. The entire time for this action to take place is about 5½ minutes. The pan was not pre-warmed prior to adding the frozen egg product to it because this would reduce any heat tolerance the white had.

EXAMPLE II

The procedure of Example I is repeated, but this time employing for the yolk phase 35 ml $H_2O$ to 30 grms of the yolk mix. Here the yolk portion, having a water to dry ingredients ratio of about 1.17, is slightly runny but satisfactory.

EXAMPLE III

The procedure of Example I is again repeated but this time employing for the yolk portion 40 mls of $H_2O$ to 30 grms of the yolk mix. The water to dry ingredients ratio is 1.33. Here the yolk is too runny and does not provide a satisfactory sunnyside up egg product. Complete frying produces a product having a flattened yolk, very similar in appearance to a natural egg having a broken yolk.

EXAMPLE IV

The procedure of Example I is again repeated but this time employing for the yolk portion 25 ml of $H_2O$ per 30 grms of the yolk mix to obtain a water to dry ingredients ratio of 0.83. This time the yolk was firm but satisfactory.

EXAMPLE V

The procedure of Example I is again repeated but this time employing for the yolk portion 20 ml $H_2O$ per 30 grms of the yolk mix. This time the yolk portion, having a water to dry ingredients ratio of 0.67, was too dry — the texture more resembling a hard-boiled than a sunnyside up egg.

Many modifications and variations of the present invention will become apparent to those skilled in the art upon reading the above disclosure. It is intended that all such modifications and variations be included within the scope of the present invention which is defined by the following claims.

What is claimed is:
1. A frozen, molded, low cholesterol egg product having a bottom egg white portion and a yolk portion situated on the top thereof, thereby resembling a sunnyside up egg product comprising:
   a. a simulated yolk portion having a water to dry ingredients ratio of from about 0.8 to about 1.2, and comprising, based on the weight of dry ingredients, from about 20% to about 45% of dry egg white, from about 5% to about 35% of an oil having a P/S of greater than 0.6, from about 10% to about 55% of a dry milk protein source, from about 0.5% to about 7% of vegetable gum, and flavoring, coloring and emulsifiers in an amount sufficient to maintain uniformity in the yolk portion and
   b. a white portion consisting essentially of liquid egg white.

2. An egg product according to claim 1 wherein the yolk portion comprises from about 25% to about 38% of the dry egg white, from about 10% to about 28% of the oil, from about 15% to about 50% of the dry milk protein source and from about 3% to about 6% of the vegetable gum.

3. An egg product according to claim 2 wherein the oil has a P/S of greater than about 1.0.

4. A molded egg product according to claim 3 wherein the water to dry ingredients ratio is about 1.

5. A method for preparing a frozen, molded, low cholesterol egg product resembling a sunnyside up egg product comprising:
   a. providing a mold having a yolk cavity and a white cavity;
   b. supplying to the yolk cavity, a simulated yolk portion having a water to dry ingredients ratio of from about 0.8 to about 1.2, and comprising, based on the weight of dry ingredients, from about 20% to about 45% of dry egg white, from about 5% to about 35% of an oil having a P/S of greater than about 0.6, from about 10% to about 55% of a dry milk protein source, from about 0.5% to about 7% of vegetable gum, and flavoring, coloring and emulsifiers in an amount sufficient to maintain uniformity in the yolk portion;
   c. supplying to the white cavity on top of the yolk portion, a white portion consisting essentially of liquid egg white; and
   d. freezing the yolk and white portions.

6. A method of making an egg product according to claim 5 wherein the yolk portion of the egg product comprises from about 25% to about 38% dry egg white, from about 10% to about 28% of the oil, from about 15% to about 50% of the dry milk protein source and from about 3% to about 6% vegetable gums.

7. A method for preparing a frozen egg product according to claim 6 wherein the oil in the yolk portion has a P/S of greater than about 1.0.

8. A method for preparing a frozen egg product according to claim 7 wherein the water to dry ingredient ratio of the yolk portion is about 1.

9. A method for preparing a low cholesterol egg product resembling a sunnyside up egg product comprising:
   a. providing a mold having yolk cavity and a white cavity;
   b. supplying to the yolk cavity, a simulated yolk portion having a water to dry ingredient ratio of from about 0.8 to about 1.2, and comprising, based on the weight of dry ingredients, from about 20% to about 45% of dry egg white, from about 5% to about 35% of an oil having a P/S of greater than about 0.6, from about 10% to about 15% of a dry milk protein source, from about 0.5% to about 7% of vegetable gum, and flavoring, coloring and emulsifiers in an amount sufficient to maintain uniformity in the yolk portion;
   c. supplying to the white cavity on top of the yolk portion, a white portion consisting essentially of liquid egg white;
   d. freezing the yolk and white portions;
   e. removing the frozen egg product from the mold; and
   f. frying the egg product over low heat to obtain a cooked, natural appearing sunnyside up egg product.

10. A method according to claim 9 wherein the yolk portion comprises from about 25% to about 38% of the dry egg white, from about 10% to about 28% of the oil, from about 15% to about 50% of the dry milk protein source and from about 3% to about 6% of the vegetable gums.

* * * * *